Figure 1:
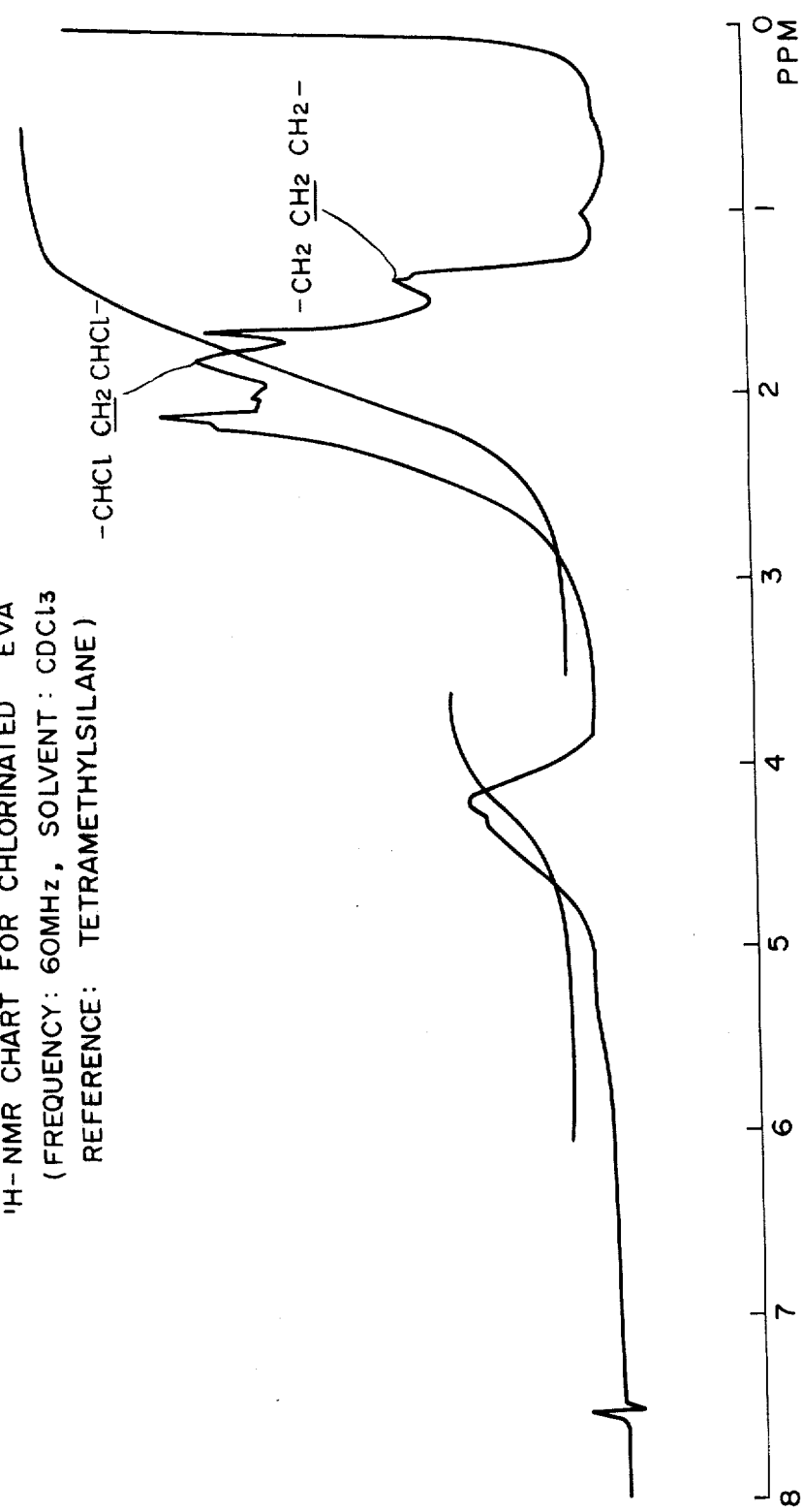

United States Patent [19]

Watanabe et al.

[11] 4,123,477

[45] Oct. 31, 1978

[54] POLYVINYLIDENE CHLORIDE RESIN COMPOSITIONS

[75] Inventors: Takeshi Watanabe; Kenichiro Kodama, both of Nobeoka, Japan

[73] Assignee: Asahi-Dow Limited, Tokyo, Japan

[21] Appl. No.: 848,521

[22] Filed: Nov. 4, 1977

[30] Foreign Application Priority Data

Nov. 9, 1976 [JP] Japan .................................. 51-133735

[51] Int. Cl.$^2$ .............................................. C08L 23/28
[52] U.S. Cl. ............................ 260/897 C; 260/23 XA
[58] Field of Search ..................................... 260/897 C

[56] References Cited

U.S. PATENT DOCUMENTS 3,076,781   2/1963   Frey ...................................... 260/897
3,145,187   8/1964   Hankey et al. ........................ 260/23

FOREIGN PATENT DOCUMENTS 16,420/67   1967   Japan.
11,663/72   1972   Japan.

*Primary Examiner*—Carman J. Seccuro
*Attorney, Agent, or Firm*—Cushman, Darby & Cushman

[57] ABSTRACT

Greatly improved heat and light resistance is imparted to polyvinylidene chloride resins by incorporating therein a specific chlorinated ethylene-vinyl ester copolymer to minimize the quantities in said resins of conventional additives, of which migration is undesirable from a viewpoint of food hygiene. The resulting polyvinylidene chloride resin compositions also have excellent gas barrier properties and high transparency.

6 Claims, 4 Drawing Figures

POLYVINYLIDENE CHLORIDE RESIN COMPOSITIONS

This invention relates to a polyvinylidene chloride resin composition which is suitable for manufacture of transparent molded articles excellent in heat and light resistance as well as gas barrier properties with a low content of additives, which may be migrated into the materials contained in said articles.

Polyvinylidene chloride polymers will exhibit highly crystalline state due to regular and symmetrical structures thereof and have such a high cohesive force that there can scarcely been found a solvent for dissolving said polymers. While they have high melting points for this reason, they are liable to chemical degradation to release hydrochloric acid. Therefore, it is practically impossible to subject polyvinylidene chloride polymers alone to heat molding because of excessive thermal deterioration. Thus, in commercially available molded articles of polyvinylidene chloride resins, a small amount of comonomers such as vinyl chloride is used to be copolymerized with vinylidene chloride to disturb a part of regular structure of polyvinylidene chloride as mentioned above and additives such as plasticizers or heat stabilizers are also added.

Addition of a plasticizer to a polyvinylidene chloride resin will not only improve moldability of said resin, but also impart flexibility to improve its impact strength. On the other hand, this method is disadvantageous in that excellent gas barrier properties of polyvinylidene chloride resins tend to be deteriorated by use of additives such as plasticizers which are in state of liquid at a temperature, at which molded articles are to be used or stored. Accordingly, the quantity of a plasticizer used is suppressed to a minimum necessary for intended use. Even at such a minimum level, gas barrier properties are lowered to make polyvinylidene chloride resins, which are at present commercially available, unsatisfactory.

In order to overcome the drawback as mentioned above, there has been proposed to replace at least a part of plasticizer with a rubbery substance such as butadiene copolymers or ethylene-vinyl acetate copolymers. These copolymers are, however, inferior to plasticizers in plasticizing ability. Accordingly, when they are used in place of plasticizers, it is required to use a greater amount of such copolymers. Due to poor compatibility of these copolymers with polyvinylidene chloride resins, transparency of molded articles is lost when they are used in a large amount. More specifically, in case of butadiene copolymers, impact resistance of molded articles can be improved, but butadiene copolymers, when molded at temperatures for molding polyvinylidene chloride resins, have no good melt-flow characteristics to be poor in plasticizing ability and are also prone to photo-degradation to a great extent due to inner double bonds to lower extremely commercial values of the molded articles. On the other hand, in case of ethylene-vinyl acetate copolymer, there is no problem, so far as light resistance is concerned. With a copolymer containing a large proportion of ethylene, however, compatibility with vinylidene chloride resin is poor. In an extreme case, phase separation may sometimes occur between the copolymer and polyvinylidene chloride resin. As the increase in proportion of vinyl acetate in ethylene-vinyl acetate copolymer up to about 40 wt.%, compatibility with polyvinylidene chloride resin is improved. When a copolymer with such a composition is incorporated in molded article of polyvinylidene chloride resin for package of oily or watery foods and subjected to heat treatment, the molded article loses its transparency. Thus, the field of application is limited. Further, impact strength of a composition containing a copolymer with larger vinyl acetate content is inferior to that with larger ethylene content.

It is also proposed to use a ternary copolymer of ethylene-vinyl ester-vinyl chloride, as disclosed by 36-Plastics Manuf. Vol. 77, p.37, 140996u, 1972, in place of a plasticizer in total or in part to provide a polyvinylidene chloride type resin composition for molding articles excellent in transparency, gas barrier properties, impact strength and non-extract property. In fact, the polyvinylidene chloride type resin composition comprising said ternary copolymer is found to have excellent characteristics as mentioned above. But said composition is still unsatisfactory in that molded articles obtained therefrom are inferior in light stability. Further, heat resistance is also insufficient and molded articles are discolored in dark.

The object of the present invention is to provide a polyvinylidene chloride resin composition suitable for molded articles having excellent transparency and gas barrier properties of polyvinylidene chloride resins and being also excellent in heat resistance as well as light resistance.

It has now been unexpectedly found that the above object can be accomplished by incorporating a chlorinated ethylene-vinyl ester copolymer in a polyvinylidene chloride resin. Chlorinated ethylene-vinyl ester copolymer is known to be useful as a modifier for an adhesive blend comprising a polyamide and a chlorinated ethylene-vinyl acetate copolymer as disclosed by U.S. Pat. No. 3,464,940. It is also known to be useful as a reinforcing material for improving impact strength of a rigid polyvinyl chloride resin as disclosed by Chemical Abstracts Vol. 68, p.2990, 30587t, 1968. It is entirely unexpected that such a chlorinated ethylene-vinyl ester copolymer will serve to improve various characteristics of polyvinylidene chloride resins which are substantially different in chemical and physical properties from the polymers or resins for which chlorinated ethylene vinyl ester copolymer has been known to be useful. Further, this is surprising enough in view of the fact that ethylene-vinyl ester-vinyl chloride ternary copolymer, which also contains chlorine atoms in the polymeric molecule, proved to be unsatisfactory for improvement of polyvinylidene chloride resins.

According to the present invention, there is provided a resinous composition comprising:

(A) a copolymer of 75 to 95% by weight of vinylidene chloride and 25 to 5% by weight of a monomer copolymerizable with vinylidene chloride and (B) chlorinated ethylene-vinyl ester copolymer containing 10 to 40% by weight of vinyl ester and 3 to 55% by weight of chlorine, the amount of (B) being in the range from 3 to 60 parts by weight based on 100 parts by weight of (A).

Figure 2:
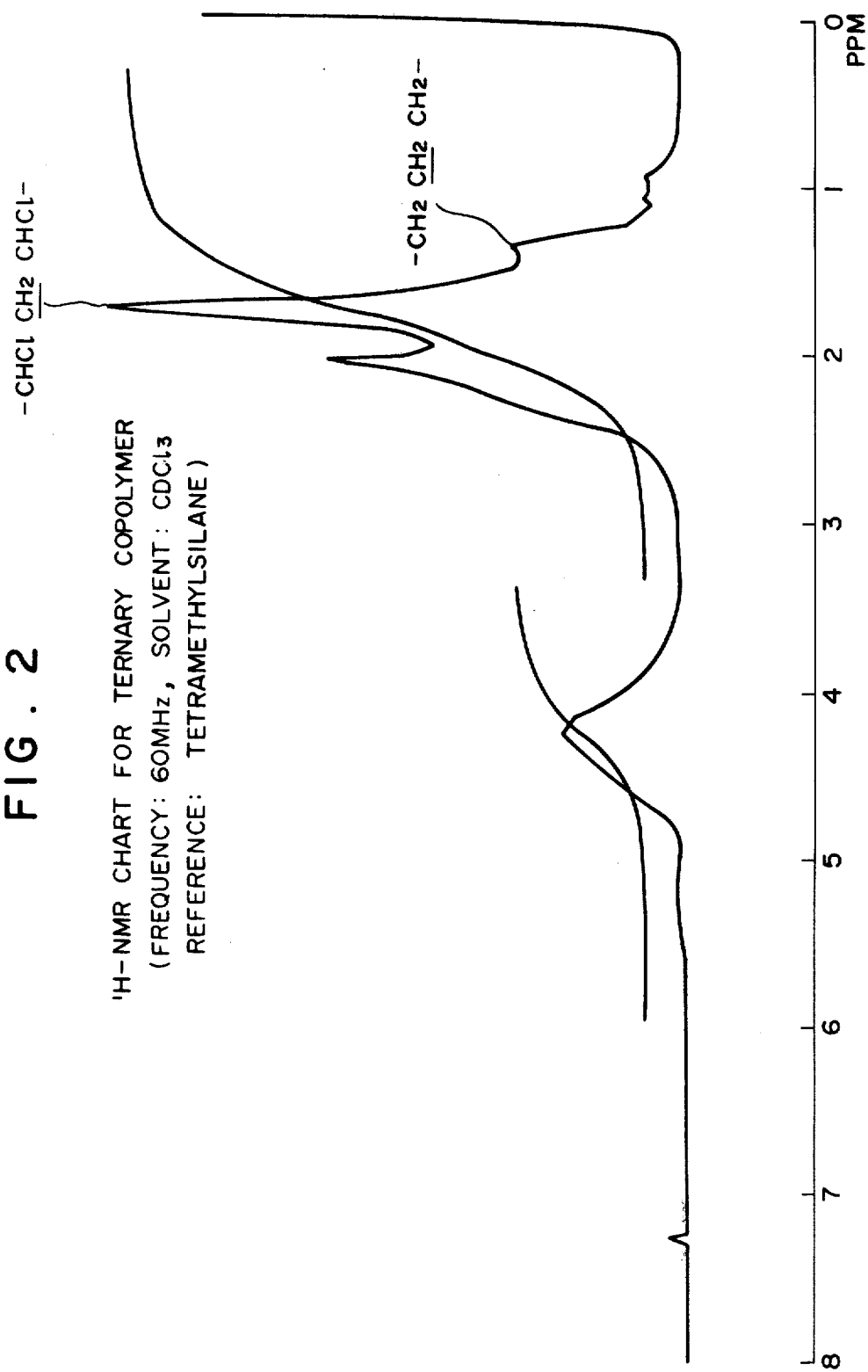
Figure 3:
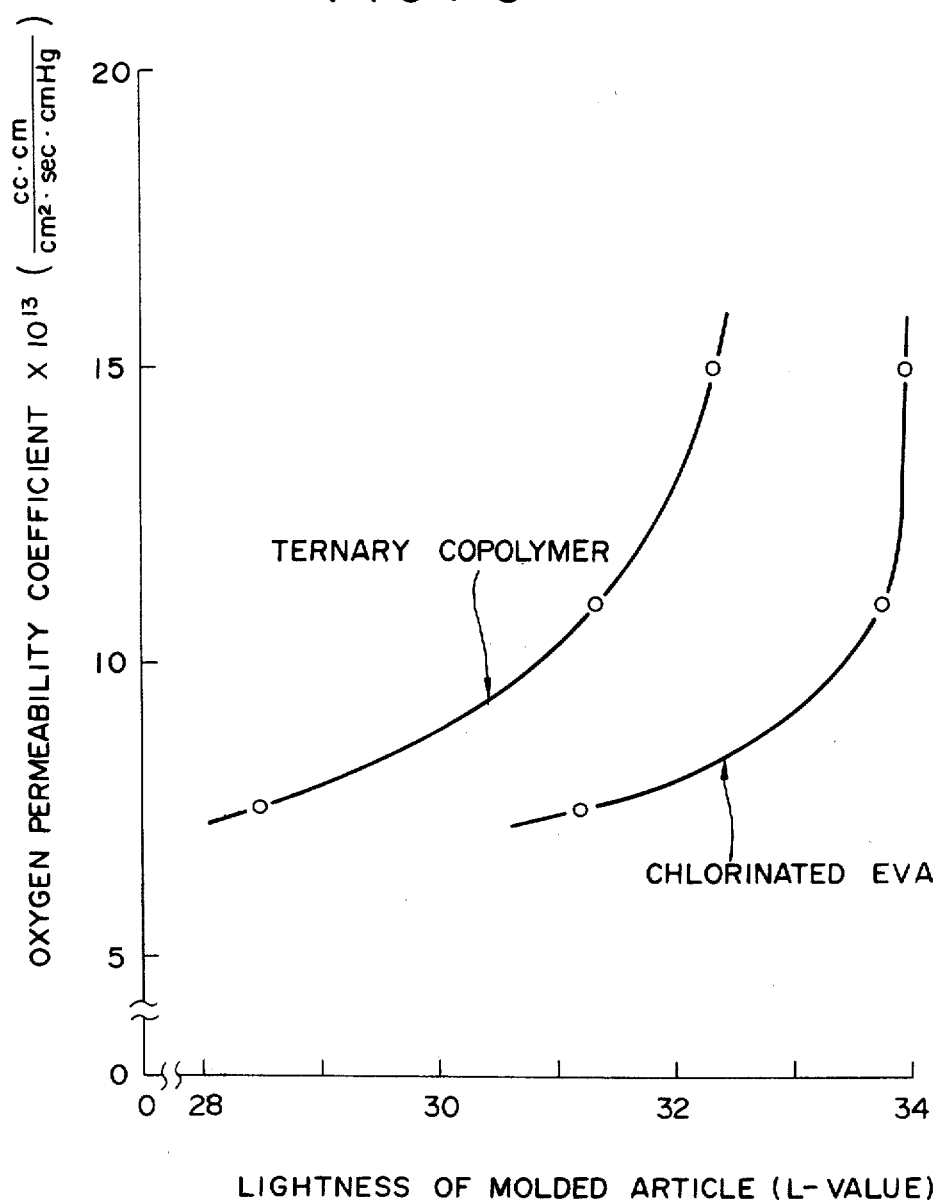
Figure 4:
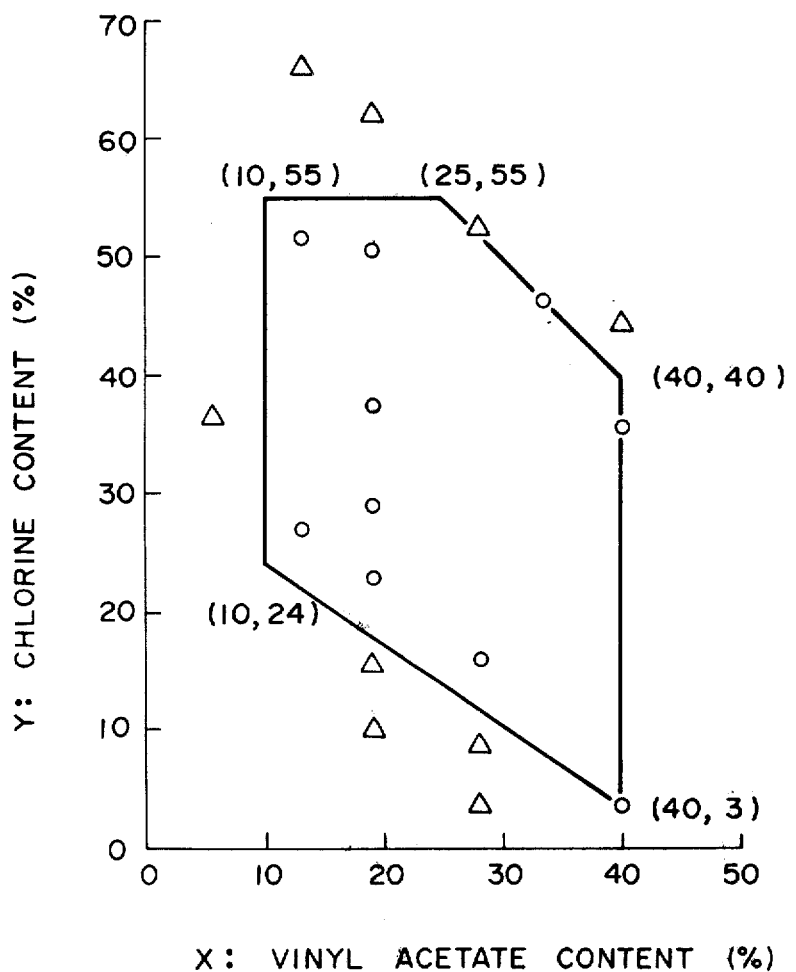

In the accompanying drawings,

FIGS. 1 and 2 show NMR spectrum charts for chlorinated ethylene-vinyl ester copolymer and for ethylene-vinylidene chloride-vinyl chloride terpolymer, respectively;

FIG. 3 relationship between oxygen permeability and lightness of molded articles prepared from compositions containing chlorinated ethylene-vinyl acetate copolymer and ethylene-vinylidene chloride-vinyl acetate copolymer; and FIG. 4 relationship between vinyl acetate content and chlorine content suitable for the present composition.

The chlorinated ethylene-vinyl ester copolymer employed in the present invention is obtained by chlorinating ethylene-vinyl ester copolymer according to conventional methods. The ethylene-vinyl ester copolymer to be used in the present invention includes copolymers of ethylene with at least one vinyl esters such as vinyl formate, vinyl acetate, vinyl propionate, vinyl butyrate, and the like. Among them, ethylene-vinyl acetate copolymer is preferred since it is readily available at low cost.

The content of vinyl ester in the ethylene-vinyl ester copolymer provided for the present invention influences heat stability, melt viscosity or compatibility with polyvinylidene chloride resin of the chlorinated copolymer. It is desirably within the range from 10 to 40% by weight of unchlorinated copolymer. With a vinyl ester content less than 10% by weight, no practically useful transparent molded article can be obtained, although compatibility with polyvinylidene chloride resin can be improved to some extent by chlorination. On the other hand, ethylene-vinyl ester copolymer with more than 40% by weight of vinyl ester has itself some tackiness and so called blocking phenomenon is observed on storage for a long term. Such a tackiness is further increased by chlorination of the copolymer to render the copolymer very intractable. A tacky copolymer is difficultly blended with polyvinylidene chloride resin and blending method is limited to such a method as solution blending to increase blending cost enormously. The ethylene-vinyl ester copolymer to be used in the present invention generally has a melt index (ASTM-D-1238) of 0.1 to 1000, preferably 1 to 500.

The chlorine content in the chlorinated ethylene-vinyl ester copolymer is generally within the range from 3 to 55% by weight based on the chlorinated copolymer. A chlorinated ethylene-vinyl ester copolymer with more than 55% by weight of chlorine content is too rigid to be plastified and liable to suffer from thermal decomposition. Hence, molding with polyvinylidene chloride resin is difficult unless the chlorinated copolymer is loaded with a considerable amount of plasticizers. On the other hand, with a low chlorine content less than 3% by weight, the effect by incorporation of the chlorinated copolymer is not significantly great. Further, use of such a low chlorine content copolymer is not practical, considering the cost involved in chlorination.

According to the present invention, it is also found that there is a specific relation between vinyl ester content and chlorine content in order to obtain excellent transparency when the composition of the present invention is utilized for transparent molded articles. Namely, chlorine content of chlorinated ethylene-vinyl ester copolymer in the composition to be used for transparent molded articles is desired to fall within the following range:

$$-0.7 X + 31 \leq Y \leq -X + 80 \quad (I)$$

wherein X is vinyl ester content (% by weight based on unchlorinated ethylene-vinyl ester copolymer) and Y is chlorine content (% by weight based on chlorinated ethylene-vinyl ester copolymer).

The chlorinated ethylene-vinyl ester copolymer to be used in the present invention is confirmed to have a structure essentially different from that of a ternary copolymer of ethylene-vinyl ester-vinyl chloride. FIG. 1 shows NMR spectrum of typical example (Example 11) of chlorinated ethylene-vinyl acetate copolymer, while FIG. 2 that of typical example (Comparison example 6) of ethylene-vinyl acetate-vinyl chloride terpolymer. In FIG. 2, at a position of $\delta = 1.8$ ppm, there is seen a strong absorption by the proton of methylene in recurring vinyl chloride units, while the absorption near said position is by far smaller in FIG. 1.

While being not bound by any theory, the improvement brought about by use of chlorinated ethylene-vinyl ester copolymer in place of ethylene-vinyl ester-vinyl chloride terpolymer is believed to be intimately related with the difference in structure between both copolymers. More specifically, in ethylene-vinyl ester-vinyl chloride terpolymer prepared by, for example, radical copolymerization, the composition of the resultant copolymer is determined by the ratio of monomers present at the time of polymerization and relative reactivities thereof. Monomeric units of each component are distributed along the main chain of the polymer according to the law of statistic. In such a copolymer, it is highly probable that there is a portion of recurring units of vinyl chloride in which vinyl chloride monomers are polymerized via head-to-tail linkage. Once one monomeric unit in such recurring units is attacked by heat or light to effect dehydrochlorination, there ensues propagation of dehydrochlorination to adjacent units to cause so called zipper reaction. As the result, a conjugated polyene structure is formed in the polymer to cause discoloration. In contrast, in the chlorinated ethylene-vinyl ester copolymer of this invention chlorine is introduced by chlorination reaction, whereby chlorine atoms are substituted for hydrogen at random positions in the molecules of said copolymer. With such a mechanism, recurring units of polymerized vinyl chloride are not likely to be formed in the chlorinated copolymer. This difference in structure is considered to contribute much to the difference in behaviors when exposed to heat or light between the composition containing chlorinated ethylene-vinyl ester copolymer and that containing ethylene-vinyl ester-vinyl chloride terpolymer.

The polyvinylidene chloride resins of this invention refer to copolymers of vinylidene chloride as principal component with other copolymerizable monomers, containing 75 to 95% by weight, preferably 80 to 93% by weight of vinylidene chloride based on the copolymer. They are generally prepared by copolymerizing 60 to 95 parts by weight of vinylidene chloride with 40 to 5 parts by weight of other comonomers according to conventional methods to obtain the copolymer with a composition as specified above. The comonomer copolymerizable with vinylidene chloride may include vinyl chloride, acrylic esters (e.g. methyl acrylate, ethyl acrylate, butyl acrylate, 2-ethylhexyl acrylate, etc.), methacrylic esters (e.g. methyl methacrylate, ethyl methacrylate, butyl methacrylate, lauryl methacrylate, stearyl methacrylate, etc.), unsaturated carboxylic acids or acid amides thereof (e.g. acrylic acid, methacrylic acid, acrylic acid amide, etc.), maleic acid monoesters (e.g. monomethyl maleate, monobutyl maleate, etc.), vinyl esters (e.g. vinyl acetate, vinyl propionate, etc.), and so on. These comonomers may be used either singly or as a combination of two or more monomers. Any of the known methods conventionally used for polymerization of vinylidene chloride can be used for preparation of the aforesaid copolymer. For example, there may be employed suspension polymerization, emulsion polymerization, solution polymerization, etc. Polymerization may be batchwise, but other methods such as by stepwise or continuous addition of monomers during polymerization can also be adopted. Polymerization degree of the copolymer is generally from 0.5 to 2.5 c.p.s., preferably from 0.8 to 1.5 c.p.s. (2% o-dichlorobenzene solution, at 120° C., measured by Ubbelohde's viscometer).

The polyvinylidene chloride resin to be used in the present invention is a copolymer containing principally vinylidene chloride together with other comonomers such as vinyl chloride and substantially distinguished from polyvinyl chloride resin comprising vinyl chloride polymer or a copolymer containing vinyl chloride as principal component. In this sense, it is critical that polyvinylidene chloride resin of the present invention should contain at least 75% by weight of vinylidene chloride. In a copolymer comprising vinylidene chloride and vinyl chloride, the crystalline state of the copolymer varies with the monomeric composition and therefore compatibility with solvents as well as rheological properties are also greatly varied. As to the relation between the composition and crystalline structure, the crystalline structure of a copolymer with molar ratio of vinylidene chloride of 0.560 or more is the same as that of polyvinylidene chloride homopolymer, while that of a copolymer with molar ratio of 0.145 or less is the same as that of polyvinyl chloride homopolymer, copolymers with intermediate composition having no crystalline structure. With a copolymer having molar ratio of vinylidene chloride of 0.560 or more, degree of crystallinity is decreased as the decrease in molar ratio of vinylidene chloride (see J. Polymer Science, $A_2$, p.1749, 1964). Further, in polyvinyl chloride polymer, as different from polyvinylidene chloride polymer, chlorine atoms attached to the main chain of the polymer are not positioned symmetrically to limit the movement of polymer segments. Therefore, commercially applicable atactic polyvinyl chloride will not form crystalline polymers. Due to said difference in crystallinity, polyvinylidene chloride polymer is not compatible with polyvinyl chloride polymer. They are also different in compatibility with solvents and plasticizers. Such a difference leads to difference in gas barrier properties between the both polymers. These differences are well discussed in the literatures (see, for example, "Polyvinylidene chloride resin" by Toyohisa Sonoda, Nikkan Kogyo Shinbun Co., Japan; Polymer Preprint, 8, p.137, 1967).

As mentioned above, the proportion of the chlorinated ethylene-vinyl ester copolymer added to polyvinylidene chloride type resin is from 3 to 60 parts by weight based on 100 parts by weight of polyvinylidene chloride resin. When the chlorinated ethylene-vinyl ester copolymer exceeds 60 parts by weight, the molded article obtained is lowered in tensile strength and handling at a high temperature is particularly troublesome. On the other hand, with content of lower than 3 parts by weight of the chlorinated ethylene-vinyl ester copolymer, moldability and properties of molded article obtained are insufficient and it is necessary to employ a considerable amount of plasticizers in combination, whereby gas barrier properties of molded articles become similar to those of conventional products to lose the characteristic of the present invention.

The method for preparing the composition according to the present invention is not limited but various methods can be employed. One method is to blend merely pellets or powders of chlorinated ethylene-vinyl ester copolymer with polyvinylidene chloride resin. Another method is to add a solution of chlorinated ethylene-vinyl ester copolymer to polyvinylidene chloride resin, followed by removal of the solvent. Alternatively, chlorinated ethylene-vinyl ester copolymer may be dissolved in a mixture of vinylidene chloride monomer and other copolymerizable monomers, followed by polymerization, to thereby disperse homogeneously chlorinated ethylene-vinyl ester copolymer in the copolymerized polyvinylidene chloride resin.

In the present composition, there may also be added other additives such as plasticizers, heat stabilizers, light stabilizers, lubricants, etc. depending on the intended uses. But, for the purpose of obtaining a composition and molded articles thereof with excellent gas barrier properties featured in the present invention, the sum of such additives is suitably not more than 10 parts by weight based on 100 parts by weight of polyvinylidene chloride resin.

The resin composition provided by the present invention is particularly suitable for manufacturing transparent molded articles with various shapes such as films, sheets, tubes, bottles and the like. One of the advantages provided by the present composition is to impart excellent gas barrier characteristic to such a molded article prepared therefrom. This makes the molded articles valuable in uses for packages of various materials. Another advantage is that due to its excellent moldability additives such as plasticizers can be decreased to a great extent, so that contents within packaging materials made of the present composition will not suffer from migration of such additives from the packaging materials. Still another advantage of the present composition is its excellent resistance to heat as well as light. Thus, there is no need to employ heat stabilizers or light stabilizers in such large quantities as required in a composition comprising ethylene-vinyl ester-vinyl chloride ternary copolymer and polyvinylidene chloride resin of prior art. Heat stabilizers such as epoxidized vegetable oil added to the composition will lower gas barrier property of the composition, while light stabilizers such as triazole type, benzophenone type or salicyclic acid type are not favorable from the standpoint of food hygiene, when the composition is applied for packaging foods. Further, the molded article prepared from the composition of the present invention is excellent in lightness. FIG. 3 shows the relation between lightness and oxygen permeability coefficient of chlorinated ethylene-vinyl ester copolymer, in comparison with that of a composition of polyvinylidene chloride type resin and ethylene-vinyl ester-vinyl chloride ternary copolymer. This clearly shows excellent gas barrier property of the molded article prepared from the present composition.

The present invention is illustrated in further detail by the following Examples, and Comparison examples, in which all parts and percentages are by weight unless otherwise specifically noted.

EXAMPLE 1

A vinylidene chloride-vinyl chloride copolymer, containing 88.2% of vinylidene chloride and having a viscosity of 1.09 c.p.s. (2% o-dichlorobenzene solution, 120° C.) is obtained by suspension polymerization, according to a conventional method, of a mixture comprising 78 parts of vinylidene chloride, 22 parts of vinyl chloride and 0.5 parts of acetyl tributyl citrate solution having 20% of diisopropylperoxy dicarbonate dissolved therein.

In a separable four-necked glass flask of 2 liter capacity equipped with a stirrer and a cooling pipe, there are charged 100 g of Elvax 40 (trade mark: ethylene-vinyl acetate copolymer containing 40% vinyl acetate; E.I. Du Pont de Nemours, U.S.A.), 2 g of azobisisobutyronitrile and 700 ml of carbon tetrachloride to be homogeneously dissolved while heating the mixture up to 75° C. After the temperature is raised to 75° C., chlorine gas is blown into the mixture continuously to carry out the reaction for 4 hours. After the reaction, heating and feeding of chlorine gas are discontinued, and chlorine dissolved in the reaction mixture is purged by nitrogen gas. Analysis gives the result that chlorine content of chlorinated Elvax 40 after removal of the solvent is 3.9%.

A solution of 100 g of the chlorinated product as prepared above dissolved in chloroform is mixed with 1 kg of the aforesaid vinylidene chloride-vinyl chloride copolymer, followed by removal of chloroform by evaporation. The resultant composition is extruded with a screw type extruder having cylinder diameter of 1.5 inch and L/D of 12 by a conventional method to obtain unstretched parison and inflation film.

COMPARISON EXAMPLE 1

A composition comprising a mixture of the vinylidene chloride-vinyl chloride copolymer obtained in Example 1 and several plasticizers, namely 3.0% of acetyl tributyl citrate, 3.5% of dibutyl sebacate and 1.7% of epoxidized soybean oil is prepared. This composition is extruded similarly as in Example 1 to obtain unstretched parison and inflation film.

EXAMPLE 2

Chlorination is repeated in the same manner as in Example 1 except that 2 g of lauroyl peroxide is used in place of 2 g of azobisisobutyronitrile. The chlorinated Elvax 40 contains 7.7% of chlorine.

A mixture of 100 g of the thus prepared chlorinated product with 1 kg of vinylidene chloride-vinyl chloride copolymer of Example 1 mixed similarly as in Example 1 is extruded in the same manner as in Example 1 to obtain unstretched parison and inflation film.

EXAMPLE 3

Using the same reaction apparatus as in Example 1, chlorination reaction is carried out by flowing chlorine gas continuously into a homogeneous mixture of 100 g of Elvax 40 and 700 ml of carbon tetrachloride at 75° C. for 20 hours. During the reaction, the reaction mixture is irradiated by photographic light (photoreflector lamp, DAYLIGHT FOR COLOR FLOOD, 100 V, 500 W, Toshiba K.K., Japan) from outside of the reaction vessel. The resultant chlorinated Elvax 40 contains 15.6% of chlorine.

Similarly as in Example 1, unstretched parison and inflation film are produced from a composition comprising 100 g of this chlorinated product and 1 kg of vinylidene chloride-vinyl chloride copolymer of Example 1.

EXAMPLE 4

By the same method and under the same conditions as in Example 3, chlorination is carried out under irradiation of light by blowing chlorine gas for 21 hours into a mixture of 300 g of Elvax 40 and 1500 ml of carbon tetrachloride. Before and in the course of the reaction after 7 hours and 14 hours after initiation of the reaction, lauroyl peroxide is added each in amount of 2 g, 6 g as a total, to the reaction mixture. The chlorinated product obtained contains 27.0% of chlorine.

Unstretched parison and inflation film are obtained by extrusion molding of a composition comprising 100 g of this chlorinated product and 1 kg of vinylidene chloride-vinyl chloride copolymer according to the procedure as described in Example 1.

COMPARISON EXAMPLE 2

A solution of 100 g of Elvax 40 dissolved in chloroform is mixed with 1 kg of vinylidene chloride-vinyl chloride copolymer of Example 1. After removal of the solvent, the resultant composition is extrusion molded similarly as in Example 1 to obtain unstretched parison and inflation film.

COMPARISON EXAMPLE 3

According to the same method as in Example 4 under irradiation of light, chlorine gas is injected to a mixture of 100 g of Elvax 40 and 1500 ml of carbon tetrachloride at 75° C. for 100 hours. But lauroyl peroxide is added at initiation of the reaction and in the course of the reaction, per every lapse of 7 hours, 14 times each in amount of 2 g, 28 g as a total. The chlorinated product contains 44.5% of chlorine.

Unstretched parison and inflation film are obtained similarly as in Example 1 from a composition comprising 100 g of this chlorinated product and 1 kg of vinylidene chloride-vinyl chloride copolymer.

COMPARISON EXAMPLE 4

Chlorination of Example 1 is repeated except that no azobisisobutyronitrile is used. The resultant chlorinated product of Elvax 40 contains 2.8% of chlorine.

Similarly as in Example 1, unstretched parison and inflation film are obtained from a composition comprising 100 g of this chlorinated product and 1 kg of vinylidene chloride-vinyl chloride copolymer of Example 1.

EXAMPLE 5

Chlorine gas is blown into a mixture of 300 g of Elvax 40 and 1500 ml of carbon tetrachloride at 75° C. for 15 hours. The chlorinated product obtained contains 10.5% of chlorine.

This chlorinated Elvax 40 (200 g) is dissolved in vinylidene chloride. The solution is apportioned into two glass ampoules each in amount of 100 g. Into each ampoule are further added other components to obtain a composition comprising 78 parts of vinylidene chloride, 22 parts of vinyl chloride, 0.1 parts of diisopropylperoxy dicarbonate, 0.4 part of acetyltributyl citrate, 0.4 part of hydroxypropylmethyl cellulose, 140 parts of water and 20 parts of chlorinated Elvax 40. Each ampoule is subjected to polymerization, which is conducted in the first stage at 37° C. for 40 hours and in the second stage at 48° C. for 28 hours, for 68 hours as a total. The resultant composition obtained is 1045 g as a total.

Unstretched parison and inflation film are also prepared from this composition similarly as described in Example 1.

Unstretched parisons and inflation films obtained in Examples 1 to 5 and Comparison examples 1 to 4 are evaluated for rigidity, n-heptane extraction, oxygen permeability, color and transparency. The results are shown in Table 1.

In Table 1, the results are obtained according to the following measurement methods:

(1) Chlorine content: measured by Schoninger's oxygen flask; combustion method (2) Rigidity: measured by the method similar to ASTM D 1043-51, at 20° C., with a sample size of 36 mm hold length, 10 mm width, 0.50 to 0.85 thickness and with a shape factor of 5;

(3) n-heptane extraction: extracted in 400 times as much as the film volume of n-heptane, at 60° C., for 30 minutes and the film after drying is weighed and the weight lost is expressed by percentage based on the weight before extraction;

(4) oxygen permeability coefficient: measured by OX-TRAN 100 type oxygen permeability measuring instrument, Modern Control Inc., according to the method described in manual of said instrument, at measurement temperature of 20° C.

Table 1

| | Chlorine content (%) | Rigidity (kg/mm$^2$) | n-heptane extract (%) | Oxygen permeability coefficient (cc . cm/cm$^2$ . sec . cmHg) | Film appearance (thickness: about 50 μ) Color | Transparency |
|---|---|---|---|---|---|---|
| Example 1 | 3.9 | 21.0 | 0.61 | 9.4 × 10$^{-13}$ | slightly brown | transparent |
| Example 2 | 7.7 | 20.2 | 0.49 | 6.5 × 10$^{-13}$ | slightly brown | transparent |
| Example 3 | 15.6 | — | 0.37 | 3.8 × 10$^{-13}$ | slightly brown | transparent |
| Example 4 | 27.0 | 32.0 | 0.36 | 2.2 × 10$^{-13}$ | rather brown | transparent |
| Example 5 | 10.5 | 31.8 | 0.55 | 13.0 × 10$^{-13}$ | rather brown | transparent |
| Comparison example 1 | — | 36.3 | 3.22 | 28.3 × 10$^{-13}$ | slightly brown | transparent |
| Comparison example 2 | — | 63.2 | 0.18 | 4.9 × 10$^{-13}$ | slightly milky white | slightly opaque |
| Comparison example 3 | 44.5 | 54.8 | — | 0.8 × 10$^{-13}$ | slightly brown | slightly opaque |
| Comparison example 4 | 2.8 | 89.6 | 0.58 | 6.5 × 10$^{-13}$ | slightly brown | transparent |

As apparently seen from Table 1, each of Examples is smaller in rigidity than Comparative examples 2 to 4 and approximately equal to Comparative example 1. Thus, in order to obtain molded articles having flexibility equal to or better than conventional molded articles, the chlorinated copolymer is required to have a chlorine content within the range as specified above. Further, due to absence of plasticizers, the Examples show excellent gas barrier properties and are small in amount of extraction with n-heptane.

EXAMPLE 6

A series of experiments are carried out by using various chlorinated ethylene-vinyl acetate copolymer having different vinyl acetate contents and chlorine contents. Chlorination is carried out in each experiment according to either one of the following methods, by varying chlorination time in each method.

Method A: Using the same reaction apparatus as in Example 1, 150 g of ethylene-vinyl acetate copolymer, 1000 g of carbon tetrachloride are charged into the reactor and heated at 50° C. to prepare a homogeneous solution. Chlorine gas is blown into the solution at the flow rate of about 300 ml/min. to carry out chlorination reaction, during which the reaction mixture is irradiated by the lamp as used in Example 3 placed at a distance of 20 cm in front of the reactor.

Method B: Ethylene-vinyl acetate copolymer powders (200 g) and 7 g of bentonite are suspended in 1000 ml of water and chlorination is conducted at 50° C. with chlorine gas of 100 ml/min.

Each chlorinated ethylene-vinyl acetate copolymer (100 g) is mixed with 1 kg of vinylidene chloride-vinyl chloride copolymer by the same method as described in Example 1 and extruded similarly as in Example 1 to obtain an inflation film (about 50μ in thickness). Haze value is measured for each film to give the result as shown in Table 2, wherein vinyl acetate content of each ethylene-vinyl acetate copolymer contained in each film and its melt index, as well as chlorination time and chlorine content for each chlorinated ethylene-vinyl acetate copolymer are also set forth.

Table 2

| Run No. | Ethylene-vinyl acetate copolymer Vinyl acetate | M.I. | Chlorination method | Chlorination time(min) | Chlorine content (%) | Haze** value (%) |
|---|---|---|---|---|---|---|
| 1 | 5.4% | 2.8 | A | 150 | 36.3 | 31.5 |
| 2 | 12.9 | 3.9 | A | 120 | 27.2 | 8.4 |
| 3 | " | " | A | 240 | 51.4 | 8.1 |
| 4 | " | " | A | 390 | 65.8 | 35.2 |
| 5 | 19 | 400 | A | 40 | 10.0 | 33.8 |
| 6 | " | " | B | 150 | 15.6 | 12.8 |
| 7 | " | " | B | 21 | 22.6 | 9.3 |
| 8 | " | " | B | 35 | 28.8 | 7.0 |
| 9 | " | " | B | 48 | 37.0 | 7.9 |
| 10 | " | 400 | A | 390 | 50.5 | 7.9 |
| 11 | " | " | A | 540 | 61.8 | 20.5 |
| 12 | 28 | " | B | 4 | 3.6 | 12.6 |
| 13 | " | " | B | 10 | 8.7 | 11.1 |
| 14 | " | " | B | 30 | 16.0 | 7.9 |
| 15 | " | " | A | 240 | 52.6 | 25.6 |
| 16 | 33 | 30 | A | 240 | 45.9 | 9.7 |
| 17 | 40 | 55 | A | 240 | 3.9 | 4.6 |
| 18 | " | " | A | 720 | 35.6 | 5.6 |
| 19 | " | " | A | 6000 | 44.5 | 35.1 |
| 20* (Control) | — | — | — | — | — | 7.4 |

*Inflation film obtained in Comparison example 1
**JIS K 6714

An inflation film having haze value of 10% or less is found to be good in transparency, while that with haze value over 10% shows milky white color by observation with naked eyes. FIG. 4 shows a diagram in which the results given in Table 1 are plotted with marks of circle for haze value of 10% or less and marks of triangle for haze value of more than 10% on the coordinate with chlorine content as ordinate and vinyl acetate content as abscissa. FIG. 4 clearly shows that the upper limit of chlorine content is critically 55% and the relation between the chlorine content and vinyl acetate content is required to satisfy the relation represented by the formula (I) as mentioned above, for the purpose of imparting favorable transparency to a molded article such as film.

EXAMPLE 7

A vinylidene chloride-vinyl chloride copolymer, containing 92% of vinylidene chloride and having a viscosity of 1.02 c.p.s. (2% o-dichlorobenzene solution, 120° C.) is obtained by the same method as in Example 1 from a mixture comprising 85 parts of vinylidene chloride and 15 parts of vinyl chloride, using 0.15% azobisisobutyronitrile as polymerization catalyst.

The above vinylidene chloride-vinyl chloride copolymer (1 kg) is mixed with 100 g of the chlorinated ethylene-vinyl ester copolymer of Run No. 9 obtained in Example 6 and extrusion molded into an inflation film by the same method as in Example 6. The inflation film obtained is found to have a haze value of 8.5.

EXAMPLE 8

A vinylidene chloride-vinyl chloride copolymer containing 85% vinylidene chloride and having a viscosity of 1.09 (2% o-dichlorobenzene solution, 120° C.) is obtained by the same method as in Example 1 from a mixture comprising 70 parts of vinylidene chloride and 30 parts of vinyl chloride, using 0.2% of azobisisobutyronitrile as polymerization catalyst.

By using this vinylidene chloride-vinyl chloride copolymer and the chlorinated ethylene-vinyl acetate copolymer of Run No. 9 in Example 6, an inflation film is prepared by the same method as in Example 7. This film is found to have a haze value of 7.7.

EXAMPLE 9

A vinylidene chloride-methyl acrylate copolymer containing 92.4% vinylidene chloride is prepared by suspension polymerization according to a conventional method of a mixture comprising 93% vinylidene chloride and 7% methyl acrylate, using 0.2% of lauroyl peroxide as polymerization catalyst.

An inflation film is prepared from a mixture of the above copolymer and the chlorinated ethylene-vinyl acetate copolymer of Run No. 9 in Example 6 by the same method as in Example 7. This film is found to have a haze value of 7.1.

EXAMPLE 10

In a four-necked, separable glass flask of 3 liter capacity are charged 300 g of ethylene-vinyl acetate copolymer (vinyl acetate content: about 33%, M.I. = 33) dissolved in 1850 g of carbon tetrachloride. Chlorination is conducted while stirring the mixture under the condition of flow rate of chlorine gas at about 300 ml/min. at 50° C. for 6 hours.

Elemental analysis of the resultant chlorinated ethylene-vinyl acetate copolymer shows that it contains 48.4% of carbon, 6.5% of hydrogen, 8.7% of oxygen and 37.2% of chlorine. The chlorinated ethylene-vinyl acetate copolymer is found to have a reduced specific viscosity of 0.703 dl/g in cyclohexanone at 30° C.

Ten parts of this chlorinated ethylene-vinyl acetate copolymer are mixed with 90 parts of vinylidene chloride-vinyl chloride copolymer of Example 1 by the same method as in Example 1 and to the mixture is further added heat stabilizer of epoxidized soybean oil at levels of 1%, 2% and 3% to prepare three kinds of compositions. From each of these compositions, according to the same method as in Example 1, unstretched parison and inflation film are obtained. Further, unstretched parison is rolled into a volute to be provided as a sample for measurement of lightness.

Oxygen permeability coefficient measure for film and L-value measured for volute shaped unstretched parison are given in Table 3.

COMPARISON EXAMPLE 5

In an autoclave of 5 liter capacity provided with internal lining with Hastelloy B (Ni-Mo-Cr alloy) and equipped with a stirrer, there are charged 1.8 kg of water, 1.8 g of methylhydroxypropyl cellulose and 15 g of acetyl tributyl citrate solution having 20% of diisopropylperoxy dicarbonate dissolved therein. After replacement with nitrogen, followed by evacuation, 130 g of vinyl acetate, 480 g of vinyl chloride and 390 g of ethylene are introduced into the reactor. Polymerization is carried out at 50° C. for 45 hours. The initial pressure of 55 kg/cm$^2$ is lowered to 50 kg/cm$^2$ after 45 hours, with conversion of polymerization of 57.5%. The ternary copolymer obtained is found by elemental analysis to contain 49.2% carbon, 7.0% hydrogen, 8.4% oxygen and 37.1% chlorine. Its reduced specific viscosity is measured to be 0.473 dl/g.

To mixtures, each comprising 10 parts of this ternary copolymer and 90 parts of vinylidene chloride-vinyl chloride copolymer of Example 1 mixed similarly as in Example 1 are added epoxidized soybean oil at levels of 1%, 2% and 3%, respectively, to prepare three kinds of compositions. From each of these compositions are prepared by the same method as in Example 10 inflation film and involute sample for colorimetry. Oxygen permeability coefficient and lightness (L-value) are measured to give the result which is set forth together with that of Example 10 in Table 3. FIG. 3 also shows the relation between lightness of molded article and oxygen permeability thereof for each composition.

Table 3

| Amount of epoxidized soybean oil added (%) | Oxygen permeability (cc . cm/cm$^2$ . sec . cmHg) | | Lightness of molded article (L-value)** | |
|---|---|---|---|---|
| | Example 10 | Comparison example 5 | Example 10 | Comparison example 5 |
| 1 | 7.5 × 10$^{-13}$ | 7.5 × 10$^{-13}$ | 31.2 | 28.5 |
| 2 | 11.0 × 10$^{-13}$ | 11.5 × 10$^{-13}$ | 33.8 | 31.3 |
| 3 | 15.4 × 10$^{-13}$ | 16.0 × 10$^{-13}$ | 33.9 | 32.3 |

*measured at 35° C
**color difference colorimeter produced by Nippon Denshoku Co. (colorimetric reflective surface: 30 mmφ)

The molded article comprising the ternary copolymer and 1% epoxidized soybean oil has an appearance of especially dark color and has a low L-value. As apparently seen from Table 3, the molded article comprising the ternary copolymer and 2% epoxidized soybean oil exhibits the same L-value as that comprising chlorinated ethylene-vinyl acetate copolymer and 1% epoxidized soybean oil. In other words, it is necessary to add more epoxidized soybean oil by about 1% to the composition comprising the ternary copolymer than to that comprising chlorinated ethylene-vinyl acetate copolymer in order to achieve the same tone of color, with the result that gas barrier property is sacrificed corresponding to the increased amount of the additive (see FIG. 3).

EXAMPLE 11

Ethylene-vinyl acetate copolymer (vinyl acetate content: about 14%, M.I. = 15) is chlorinated by the same method as described in Example 10 except that the reaction is carried out in two steps, first at 60° C. for 2 hours, and then at 50° C. for 4.5 hours.

Elemental analysis values for the chlorinated ethylene-vinyl acetate copolymer obtained are 45.5% for carbon, 6.0% for hydrogen, 3.9% for oxygen and 44.2% for chlorine. The chlorinated ethylene-vinyl acetate copolymer has reduced specific viscosity of 0.693 dl/g.

A mixture comprising 10 parts of the chlorinated ethylene-vinyl acetate copolymer and 90 parts of vinylidene chloride-vinyl chloride copolymer of Example 1 is prepared by the same method as in Example 1. Two kinds of compositions are prepared by mixing said mixture with 2.5% and 5% of epoxidized soybean oil, respectively. From each composition is obtained unstretched parison similarly as in Example 1, which is further compression molded into a 1 mm thick plate under the conditions of 50 kg/cm$^2$, 160° C., 1 min. in the first step, and 200 kg/cm$^2$, 160° C., 1 min., in the second step.

The above molded plates are irradiated by ultraviolet ray carbon fade meter as determined in JIS-K 7102 for 46 hours, whereby the black carbon temperature is adjusted at 40° C. ± 2° C. Slight discoloration is observed by irradiation and measured by colorimeter to obtain the result shown in Table 4. Further, NMR measurement of the chlorinated ethylene-vinyl acetate copolymer gives the result as shown in FIG. 1.

COMPARISON EXAMPLE 6

In the same autoclave as used in Comparison example 5 are charged 2 kg of n-heptane and 17.5 g of acetyl tributyl citrate solution having 20% diisopropylperoxy dicarbonate dissolved therein. After replacement with nitrogen, followed by evacuation, 72 g of vinyl acetate, 631 g of vinyl chloride and 295 g of ethylene are introduced into the autoclave to conduct polymerization at 50° C. for 48 hours at initial pressure of 20 kg/cm$^2$, which is lowered to 17 kg/cm$^2$ after 48 hours. Conversion of polymerization is found to be 47.8%. Elemental analysis values for the ternary copolymer obtained are 46.8% for carbon, 6.8% for hydrogen, 3.0% for oxygen and 43.4% for chlorine, said copolymer having reduced specific viscosity of 0.180 dl/g.

Two kinds of compositions are prepared by the same method as in Example 11 by use of the ternary copolymer prepared above in place of the chlorinated ethylene-vinyl acetate copolymer. The plates prepared similarly as in Example 11 are irradiated by the same method as described in Example 11.

A considerable discoloration is observed and yellow discoloration is measured by color difference colorimeter to obtain the result as shown in Table 4. Further, NMR measurement of this ternary copolymer gives the result as shown in FIG. 2.

COMPARISON EXAMPLE 7

Two kinds of compositions are prepared by adding 2.5% and 5% of epoxidized soybean oil to the vinylidene chloride-vinyl chloride copolymer, respectively. From each of these compositions are prepared molded plates similarly as in Example 11, and irradiated by ultraviolet ray in the same manner as in Example 11 for 46 hours. The results of colorimetric analysis of the decolored plates are set forth in Table 4 together with those of Example 11 and Comparison example 6.

Table 4

| Amount of epoxidized soybean oil | Yellowness index after irradiation of UV-rays | | |
|---|---|---|---|
| | Example 11 | Comparison example 6 | Comparison example 7 |
| 2.5% | 35.3 | 77.4 | 45.0 |
| 5% | 43.9 | 74.4 | 58.5 |

Note)
Color fade test: JIS K 7102, 46 hours, 40 ± 2° C
Yellowness index: JIS K 7103

As apparently seen from the results of Table 4, the molded article comprising the ternary copolymer is very poor in resistance to light and exhibits a high degree of yellow discoloration, which is rather dark brown than yellow. In contrast, light resistance of the molded article is even better than that of Comparison example 7 and causes little yellow decoloration. As previously be explained, this difference is believed to be due to the difference in chemical structure between the chlorinated ethylene-vinyl acetate copolymer and the ternary copolymer as shown by FIG. 1 and FIG. 2, respectively.

What we claim is:

1. A polyvinylidene chloride resin composition, which comprises 100 parts by weight of (A) a copolymer of 75 to 75% by weight of vinylidene chloride and 25 to 5% by weight of a monomer copolymerizable with vinylidene chloride and 3 to 60 parts by weight of (B) a chlorinated ethylene-vinyl ester copolymer containing 10 to 40% by weight (based on unchlorinated ethylene-vinyl ester copolymer) of a vinyl ester and 3 to 55% by weight (based on chlorinated ethylene-vinyl ester copolymer) of chlorine.

2. A polyvinylidene chloride resin composition as in claim 1, wherein the copolymer (A) is a copolymer of vinylidene chloride and vinyl chloride.

3. A polyvinylidene chloride resin composition as in claim 1, wherein the chlorinated ethylene-vinyl ester copolymer is chlorinated ethylene-vinyl acetate copolymer.

4. A polyvinylidene chloride resin composition as in claim 1, wherein the chlorinated ethylene-vinyl ester copolymer contains vinyl ester and chlorine in such proportions to satisfy the following relationship:

$$-0.7 X + 31 \leq Y \leq -X + 80$$

wherein X is vinyl ester content (% by weight based on unchlorinated ethylene-vinyl ester copolymer) and Y is chlorine content (% by weight based on chlorinated ethylene-vinyl ester copolymer).

5. A transparent molded article comprising a polyvinylidene chloride resin composition as in claim 1.

6. A transparent molded article as in claim 5, which is an inflation molded film.

* * * * *